United States Patent
Park et al.

(10) Patent No.: US 12,238,528 B2
(45) Date of Patent: Feb. 25, 2025

(54) METHOD, SYSTEM, AND APPARATUS FOR SHARING DYNAMIC FREQUENCY IN MOBILE COMMUNICATION SYSTEM

(71) Applicant: Samsung Electronics Co., Ltd., Suwon-si (KR)

(72) Inventors: Seungil Park, Suwon-si (KR); Youngjoon Kim, Suwon-si (KR); Hyojin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 17/374,765

(22) Filed: Jul. 13, 2021

(65) Prior Publication Data

US 2022/0022049 A1    Jan. 20, 2022

(30) Foreign Application Priority Data

Jul. 15, 2020   (KR) .................. 10-2020-0087651

(51) Int. Cl.
*H04W 16/14* (2009.01)
*H04W 60/04* (2009.01)
*H04W 76/25* (2018.01)

(52) U.S. Cl.
CPC .......... *H04W 16/14* (2013.01); *H04W 60/04* (2013.01); *H04W 76/25* (2018.02)

(58) Field of Classification Search
CPC ..... H04W 16/14; H04W 60/04; H04W 76/25; H04W 72/0453; H04W 16/10; H04W 72/121
See application file for complete search history.

(56) References Cited

U.S. PATENT DOCUMENTS

| 11,032,720 B2 | 6/2021 | Zhao et al. |
| 11,350,423 B2 | 5/2022 | Zhao et al. |

(Continued)

FOREIGN PATENT DOCUMENTS

| KR | 10-2020-0066961 A | 6/2020 |
| WO | 2017/186294 A1 | 11/2017 |

(Continued)

OTHER PUBLICATIONS

"Requirements for Commercial Operation in the U.S. 3550-3700 MHz Citizens Broadband Radio Service Band, Document WINNF-TS-0112, Version V1.9.1", WInnForum Standards, Mar. 11, 2020, 81 pages.

(Continued)

*Primary Examiner* — Justin T Van Roie

(57) ABSTRACT

The present disclosure relates to a communication method and system for converging a 5th-Generation (5G) communication system or a 6th-Generation (6G) communication system for supporting higher data rates beyond a 4th-Generation (4G) system.

Provided is a method, system, and apparatus for sharing a dynamic frequency in a wireless communication system. A method, performed by a network entity, of assigning a frequency channel, includes: receiving a frequency channel assignment request from a first device; identifying a device cluster including the first device; and assigning, to the first device, at least one frequency channel included in a frequency channel set assigned to the device cluster including the first device. The device cluster may satisfy a certain condition and may be a set of a plurality of devices sharing at least one frequency channel included in the frequency channel set.

14 Claims, 20 Drawing Sheets

(56) References Cited

U.S. PATENT DOCUMENTS

| | | |
|---|---|---|
| 2017/0041801 A1 | 2/2017 | Liu et al. |
| 2019/0104489 A1 | 4/2019 | Huang et al. |
| 2020/0029222 A1 | 1/2020 | Mueck et al. |

FOREIGN PATENT DOCUMENTS

| | | |
|---|---|---|
| WO | 2019129169 A1 | 7/2019 |
| WO | 2019/156836 A1 | 8/2019 |
| WO | 2019/199784 A2 | 10/2019 |
| WO | 2019206073 A1 | 10/2019 |
| WO | 2020/023219 A1 | 1/2020 |
| WO | 2020/141948 A1 | 7/2020 |

OTHER PUBLICATIONS

Kulacz et al., "Coordinated Spectrum Allocation and Coexistence Management in CBRS-SAS Wireless Networks", Sep. 11, 2019, 23 pages.
Notification of Transmittal of the International Search Report and the Written Opinion of the International Searching Authority, or the Declaration dated Oct. 27, 2021 in connection with International Patent Application No. PCT/KR2021/008591, 9 pages.
Supplementary European Search Report dated Oct. 24, 2023, in connection with European Application No. 21842471.1, 8 pages.
Office Action dated Aug. 12, 2024, in connection with Korean Application No. 10-2020-0087651, 8 pages.

METHOD, SYSTEM, AND APPARATUS FOR SHARING DYNAMIC FREQUENCY IN MOBILE COMMUNICATION SYSTEM

CROSS-REFERENCE TO RELATED APPLICATION

This application is based on and claims priority under 35 U.S.C. § 119 to Korean Patent Application No. 10-2020-0087651 filed on Jul. 15, 2020 in the Korean Intellectual Property Office, the disclosure of which is incorporated by reference herein in its entirety.

BACKGROUND

1. Field

The disclosure relates to a method, system, and apparatus for sharing a dynamic frequency in a frequency sharing system.

2. Description of the Related Art

Considering the development of mobile communication from generation to generation, technologies have been developed mainly for services targeting humans, such as voice calls, multimedia services, and data services. Following the commercialization of fifth generation (5G) communication systems, it is expected that the number devices connected to communication networks will exponentially grow. Examples of connected devices may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the sixth generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bits per second (bps) and a radio latency less than 100 microseconds (μsec), and thus the speed will be 50 times as fast as 5G communication systems and have 1/10 the radio latency thereof.

In order to accomplish such a high data rate and an ultra-low latency, implementing 6G communication systems in a terahertz band (for example, 95 gigahertz to 3 terahertz bands) has been considered. It is expected that, due to more severe path loss and atmospheric absorption in the terahertz bands compared to those in millimeter wave (mmWave) bands introduced in 5G, technologies capable of securing the signal transmission distance (coverage) will become more crucial. It is necessary to develop, as major technologies for securing the coverage, multi-antenna transmission technologies including radio frequency (RF) elements, antennas, novel waveforms having a better coverage than orthogonal frequency division multiplexing (OFDM), beamforming and massive multiple input multiple output (MIMO) technology, full dimensional MIMO (FD-MIMO) technology, array antennas, and large-scale antennas. In addition, there has been ongoing discussion on new technologies for improving the coverage of terahertz-band signals, such as metamaterial-based lenses and antennas, orbital angular momentum (OAM) technology, and reconfigurable intelligent surface (RIS) technology.

Moreover, in order to improve the spectral efficiency and overall network performances, 6G communication systems have employed technologies such as a full-duplex technology for enabling an uplink (UE transmission); a downlink (node B transmission) to simultaneously use the same frequency resource at the same time and a network technology for utilizing satellites, high-altitude platform stations (HAPS); an improved network structure for supporting mobile nodes B enabling network operation optimization and automation; a technology for using AI in wireless communication for improvement of overall network operation by considering AI from the initial phase of developing technologies for 6G and internalizing end-to-end AI support functions; and a next-generation distributed computing technology for overcoming UE computing ability limitations through reachable super-high-performance communication and computing resources (multi-access edge computing (MEC) and cloud computing) over the network.

It is expected that such research and development of 6G communication systems will bring the next hyper-connected experience to every corner of life. Particularly, it is expected that services such as truly immersive extended reality (XR), high-fidelity mobile hologram, and digital replica could be provided through 6G communication systems.

SUMMARY

Provided are a method, system, and apparatus for sharing a dynamic frequency in a frequency sharing system.

Additional aspects will be set forth in part in the description that follows and, in part, will be apparent from the description, or may be learned by practice of the presented embodiments of the disclosure.

Provided are a method, system, and apparatus for sharing a dynamic frequency in a wireless communication system. A method, performed by a network entity, of assigning a frequency channel, includes: receiving a frequency channel assignment request from a first device; identifying a device cluster including the first device; and assigning, to the first device, at least one frequency channel included in a frequency channel set assigned to the device cluster including the first device. The device cluster may satisfy a certain condition and may be a set of a plurality of devices sharing at least one frequency channel included in the frequency channel set.

A network entity for assigning a frequency channel, includes: a transceiver; and a processor coupled to the transceiver and configured to: receive a frequency channel assignment request from a first device; identify a device cluster including the first device; and assign, to the first device, at least one frequency channel included in a frequency channel set assigned to a device cluster including the first device, wherein the device cluster may satisfy a certain condition and may be a set of a plurality of devices sharing at least one frequency channel included in the frequency channel set.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
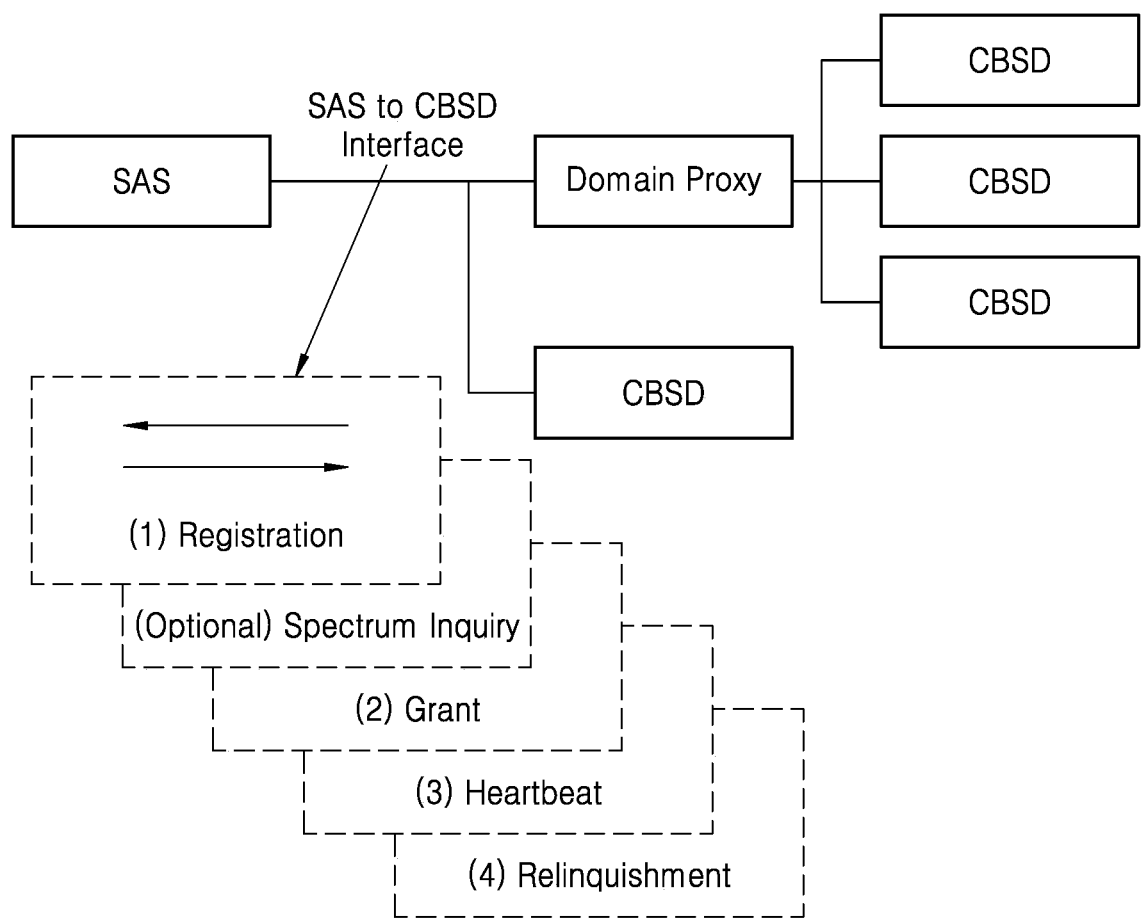
FIG. 1 illustrates a diagram showing procedures performed via an interface between a spectrum access system (SAS) and a citizen broadband radio service (CBRS) device (CBSD) in a CBRS system.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

The term "unit" in the embodiments of the disclosure means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

In the description below, a physical channel and a signal may be used interchangeably with data or a control signal. For example, a physical downlink shared channel (PDSCH) is a term referring to a physical channel where data is transmitted, but the PDSCH may also be used to refer to data. In other words, in the disclosure, the expression "a physical channel is transmitted" may be equally interpreted as the expression "data or a signal is transmitted via a physical channel".

In the disclosure hereinafter, higher layer signaling denotes a method of transmitting a signal from a base station to a UE by using a downlink data channel of a physical layer or from a UE to a base station by using an uplink data channel of a physical layer. The higher layer signaling may be understood as radio resource control (RRC) signaling or a media access control (MAC) control element (CE).

Hereinafter, for convenience of descriptions, the disclosure uses terms and names defined by the $3^{rd}$ Generation Partnership Project Long-Term Evolution (3GPP LTE) standard, the Federal Communications Commission (FCC), and Wireless Innovation (Winn) Forum Spectrum Sharing Committee (SSC). However, the disclosure is not limited by such terms and names, and may be equally applied to systems conforming to other standards. In particular, the disclosure may be applied to the 3GPP new radio (NR), i.e., the $5^{th}$ generation (5G) mobile communication standard. In the disclosure, an evolved node B (eNB) will be used interchangeably with a next generation node B (gNB) for convenience of description. In other words, a base station described as an eNB may also indicate a gNB. Also, the term 'terminal' may indicate not only mobile phones, narrow band-Internet of Things (NB-IoT) devices, and sensors, but also other wireless communication devices.

Hereinafter, a base station is an entity that assigns resources of a terminal, and may be at least one of a gNode B (gNB), an eNode B (eNB), a Node B (NB), a wireless access unit, a BS controller, or a node on a network. Examples of a terminal may include user equipment (UE), a mobile station (MS), a cellular phone, a smartphone, a computer, and a multimedia system capable of performing a communication function. The disclosure is not limited to the above examples.

In a general wireless communication system, a specific spectrum (or frequency) resource is exclusively assigned for a specific service. Representatively, in cellular communication, a nation leases a specific spectrum resource to a specific mobile network operator, and the mobile network operator that has been assigned with a resource exclusively uses the resource to maintain a cellular network. However, a resource is wasted because a spectrum assigned for each mobile network operator is not sufficiently used except a spatiotemporal situation in which data traffic is very high. In this regard, a situation in which a dynamic frequency is shared between mobile network operators may be considered. A spectrum resource with a priority right for use is assigned to each mobile network operator, and the mobile network operator may grant another mobile network operator use of the spectrum resource when the use thereof is low. In such a scenario, the mobile network operator is not required to be assigned with an unnecessarily large spectrum to deal with a peak traffic situation. Accordingly, a system for sharing a dynamic frequency between mobile network operators may be a base technology for $6^{th}$ generation (6G) or 5G mobile communication capable of operating spectrum resources efficiently.

Recently, a wireless communication system that allows sharing of an existing band used exclusively for a radar, a satellite, or the like, for a commercial purpose has emerged in the United States. Such a system is referred to as a citizen broadband radio service (CBRS), and a CBRS band using the system is defined to be 3.55 GHz to 3.70 GHz (150 MHz bandwidth). A sharing-based band is expected to increase in the future.

A CBRS system includes three tiers having different priorities. An incumbent user that is a first tier is a user using an existing CBRS band for a radar, a satellite, or the like. The incumbent user may operate in the CBRS band regardless of a user of another tier and the user of the other tier does not affect an operation or performance of the incumbent user during the operation of the incumbent user.

A primary access license (PAL) user that is a second tier is a user using the CBRS by obtaining a license in a range of 3.55 GHz to 3.65 GHz. The license denotes a right of one PAL to be assigned with a frequency channel having a bandwidth of 10 MHz in the range of 3.55 GHz to 3.65 GHz above. However, the frequency channel that may be assigned when obtaining the license is not limited to a 10 MHz frequency channel at a specific location. Also, the frequency channel assigned by the CBRS system may be changed. For example, when the operation of the incumbent user is detected and there is a command of the CBRS system to stop an operation in a current frequency channel, the PAL user is obligated to stop an operation in the current frequency channel. In this case, the CBRS system may assign another frequency band to the PAL user. A mobile network operator is able to purchase a PAL in regional units called a county in the United States, wherein seven PALs are present in one county and one mobile network operator may obtain up to four PALs. A wireless communication technology to be used by the PAL user is not determined. The PAL user may design a network by using existing wireless communication technologies, such as LTE, NR, and wireless fidelity (Wi-Fi), while satisfying only the regulations (maximum transmit power and the like) specified in the CBRS system.

A general authorized access (GAA) user that is a third tier may operate by being assigned with a frequency channel from the CBRS system in a range of 3.55 GHz to 3.70 GHz that is the CBRS band, without a license. Performance of the GAA user in the frequency channel assigned from the CBRS system is not guaranteed and the GAA user does not affect operations or performances of the incumbent user and PAL user, which are higher tiers. Like the PAL user, a wireless communication technology to be used by the GAA user is not determined. The GAA user may design a network by using existing wireless communication technologies, such as LTE, NR, and Wi-Fi, while satisfying only the regulations (maximum transmit power and the like) specified in the CBRS system.

Before describing embodiments of the disclosure, the CBRS system will be described in detail with reference to the accompanying drawings.

FIG. 1 illustrates a diagram showing procedures performed between a spectrum access system (SAS) and a CBRS device (CBSD) via an interface, in a CBRS system.

The SAS is an entity that manages a frequency channel in the CBRS system. The CBSD may be assigned with a frequency channel from the SAS and provide a network service. A concept of the CBSD is similar to that of a base station in a wireless communication system, and all base stations configuring a network of a PAL user or GAA user are referred to as CBSDs. Also, there may be an entity called a domain proxy that substitutes communication with the SAS on behalf of a plurality of CBSDs, and the domain proxy also uses an interface (SAS to CBSD interface) between the SAS and the CBSD. All processes of communication between the SAS and the domain proxy are the same as those of communication between the SAS and one CBSD, except that messages for the plurality of CBSDs are transmitted at once.

The following procedures may be performed via the interface (SAS to CBSD interface) between the SAS and the CBSD.

(1) Registration: This procedure includes two operations in which the CBSD transmits a RegistrationRequest message to the SAS and the SAS transmits a RegistrationReponse message to the CBSD. Through this procedure, the CBSD verifies that it is a valid device in the CBRS system. The RegistrationRequest message includes location information of the CBSD, and a CBSD identification (ID) is assigned to the CBSD that is normally registered, via the RegistrationReponse message. Through this procedure, the SAS identifies a location of the CBSD and uses the location information of the CBSD while managing a frequency channel later.

(2) Spectrum Inquiry (Selective procedure): This procedure includes two operations in which the CBSD transmits a SpectrumInquiryRequest message to the SAS and the SAS transmits a SpectrumInquiryResponse message to the CBSD. The CBSD may request the SAS for current state information of a specific range frequency via the SpectrumInquiryRequest message, and the SAS may provide information about a currently assignable frequency channel to the CBSD via the SpectrumInquiryResponse message. The information provided via the SpectrumInquiryResponse message may include a location of an assignable frequency channel, a type of the frequency channel (PAL or GAA), and a maximum transmit power allowable in the frequency channel. This procedure is not a procedure that is necessarily performed by the CBSD to be assigned with a frequency channel from the SAS.

(3) Grant: This procedure includes two operations in which the CBSD transmits a GrantRequest message to the SAS and the SAS transmits a GrantResponse message to the CBSD. The CBSD may request the SAS to grant operating with specific maximum transmit power in a specific frequency channel, via the GrantRequest message. Through the GrantResponse message, the SAS may allow or deny the request of the CBSD. The SAS needs to determine whether the CBSD is suitable to operate in a suggested frequency channel and maximum transmit power, and at this time, may consider the location of the CBSD. When the SAS allows the request of the CBSD, the SAS may assign a Grant ID to a corresponding grant procedure, and provide, to the CBSD, information required for an operation of a corresponding frequency channel, such as a GrantExpireTime and a HeartbeatInterval. When the SAS denies the request of the CBSD, the GrantResponse message may include information about another frequency channel for a new grant procedure. One CBSD may perform a plurality of grant procedures to be assigned with a plurality of Grant IDs.

(4) Heartbeat: This procedure includes two operations in which the CBSD transmits a HeartbeatRequest message to the SAS and the SAS transmits a HeartbeatResponse message to the CBSD. This procedure is for the CBSD with the Grant ID to be assigned with a TransmitExpireTime so as to actually use the frequency channel assigned through the grant procedure. The CBSD is able to use the assigned frequency channel only up to a time specified in a value of the TransmitExpireTime, and needs to update the value of the TransmitExpireTime by performing a heartbeat procedure every period specified in a value of the HeartbeatInterval assigned via the grant procedure. When the time specified in the value of the TransmitExpireTime is passed without performing the heartbeat procedure, the CBSD needs to stop operating in the corresponding frequency channel within 60 seconds. Also, when a time specified in a value of the GrantExpireTime assigned through the grant procedure arrives, the CBSD may request updating of the value of the GrantExpireTime via the HeartbeatRequest message and the updated value of the GrantExpireTime may be included in the HeartbeatResponse message.

(5) Relinquishment: This procedure includes two operations in which the CBSD transmits a RelinquishmentRequest message to the SAS and the SAS transmits a RelinquishmentResponse message to the CBSD. The CBSD may perform a relinquishment procedure when the frequency channel assigned with the Grant ID is no longer used. The RelinquishmentRequest message may include CBSD ID and Grant ID information, and the RelinquishmentResponse message may specify whether a relinquishment request is approved.

Figure 2:
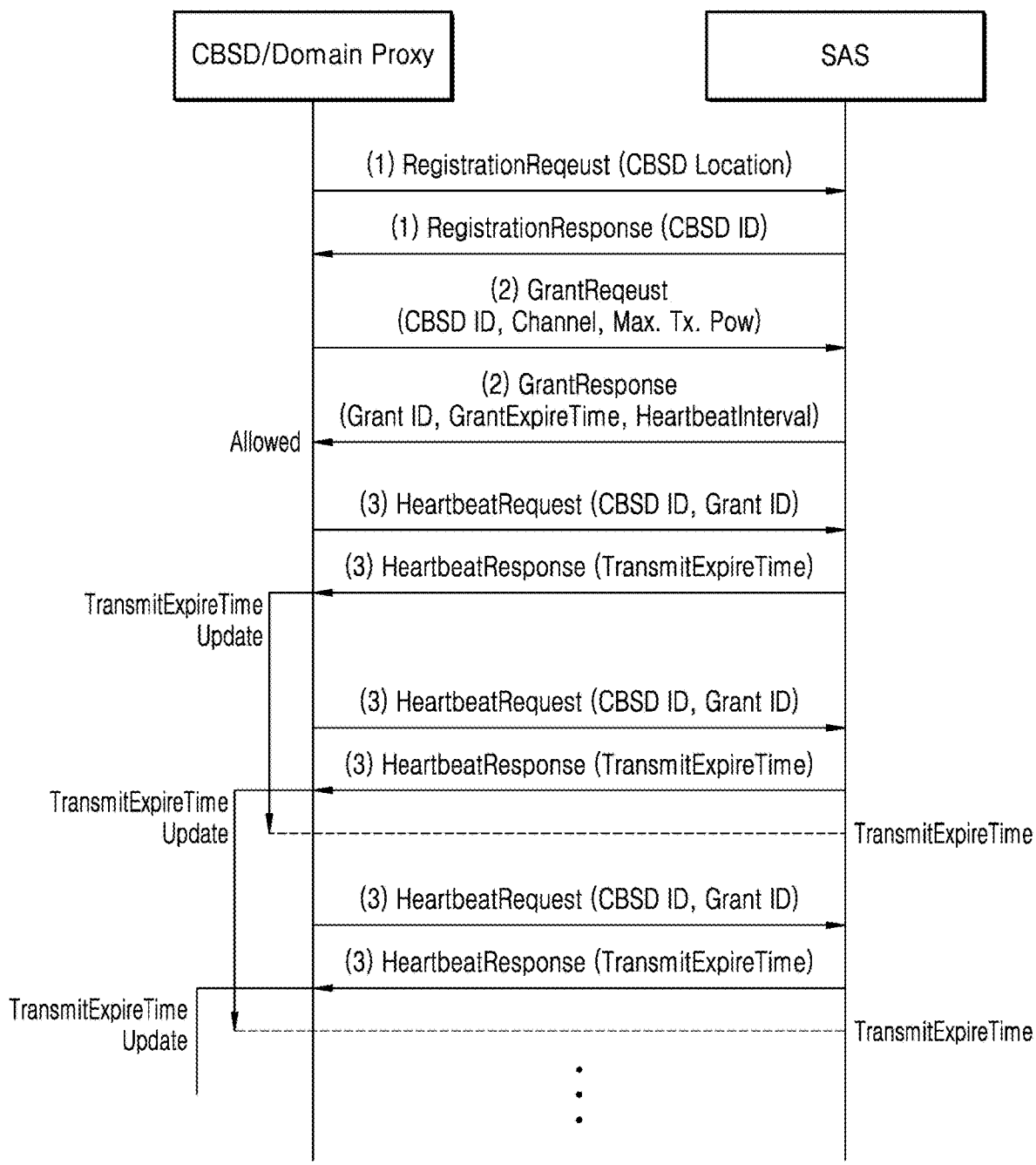
FIG. 2 illustrates a flow diagram of a message exchange procedure via an interface between an SAS and a CBSD in a CBRS system.

FIG. 2 illustrates a flow diagram of a message exchange procedure via an interface between an SAS and a CBSD in a CBRS system.

FIG. 2 illustrates a general example in which the CBSD (or a domain proxy) is assigned with a frequency channel from the SAS and periodically performs a heartbeat procedure to continuously use the assigned frequency channel. When a grant procedure, in which the CBSD receives grant for using a specific frequency channel, described above has been successfully performed in the CBRS system, the CBSD may identify communication with the SAS only through the heartbeat procedure of identifying whether the corresponding frequency channel is able to be continuously used.

A method of periodically identifying the use of the specific frequency channel is a difference from an existing exclusive license-based cellular communication system. The CBRS system performs frequency channel assignment and identification processes through such grant and heartbeat procedures due to the following reasons. When an incumbent user appears in a frequency channel where a grant procedure is completed, the SAS needs to request the CBSDs operating as a PAL or GAA user to stop operating in the frequency channel, but communication between the SAS and the CBSD may be impossible. When procedures in the CBRS system are performed even in this situation, the CBSD fails to receive a suitable HeartbeatResponse message from the SAS during the heartbeat procedure, and as a result, the corresponding frequency channel is emptied after the TransmitExpireTime has passed. Accordingly, when determining a value of the TransmitExpireTime, the SAS may set a difference (T_diff=T_TransExpire−T_HBResp) between a time (T_HBResp) when the HeartbeatResponse message is transmitted and the TransmitExpireTime (T_TransExpire) specified in the corresponding message to satisfy requirements of a maximum time taken for the SAS to request the CBSD to stop operating in a specific frequency channel.

Figure 3A:
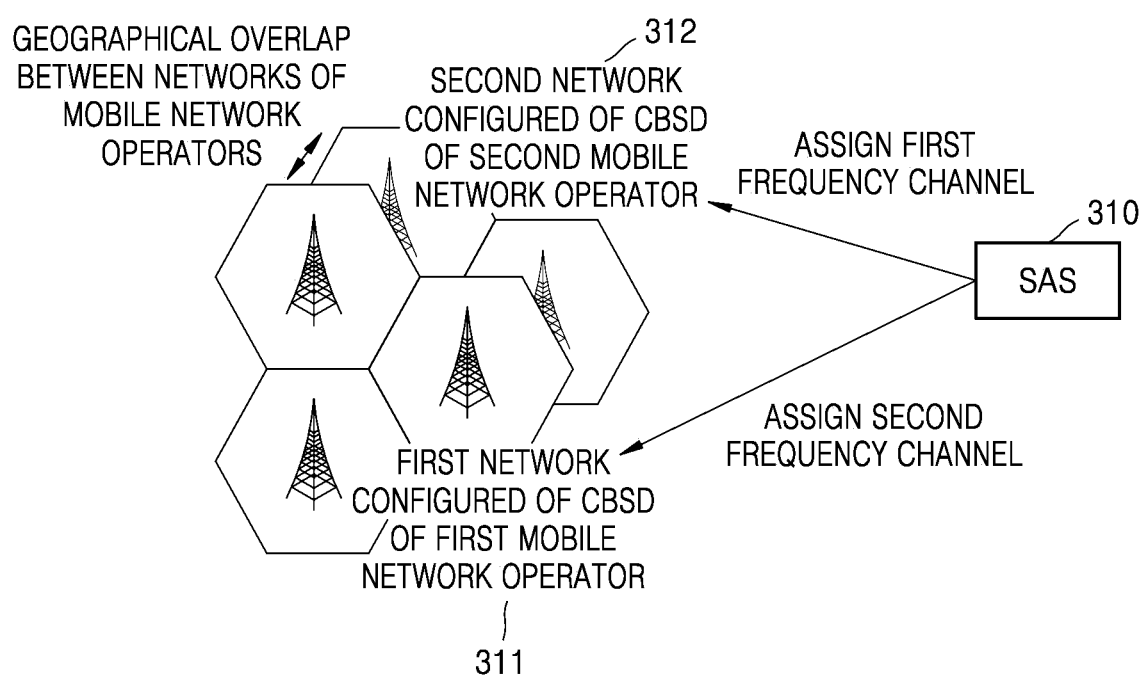
FIG. 3A illustrates a diagram for describing a method by which an SAS assigns a frequency channel.
Figure 3B:
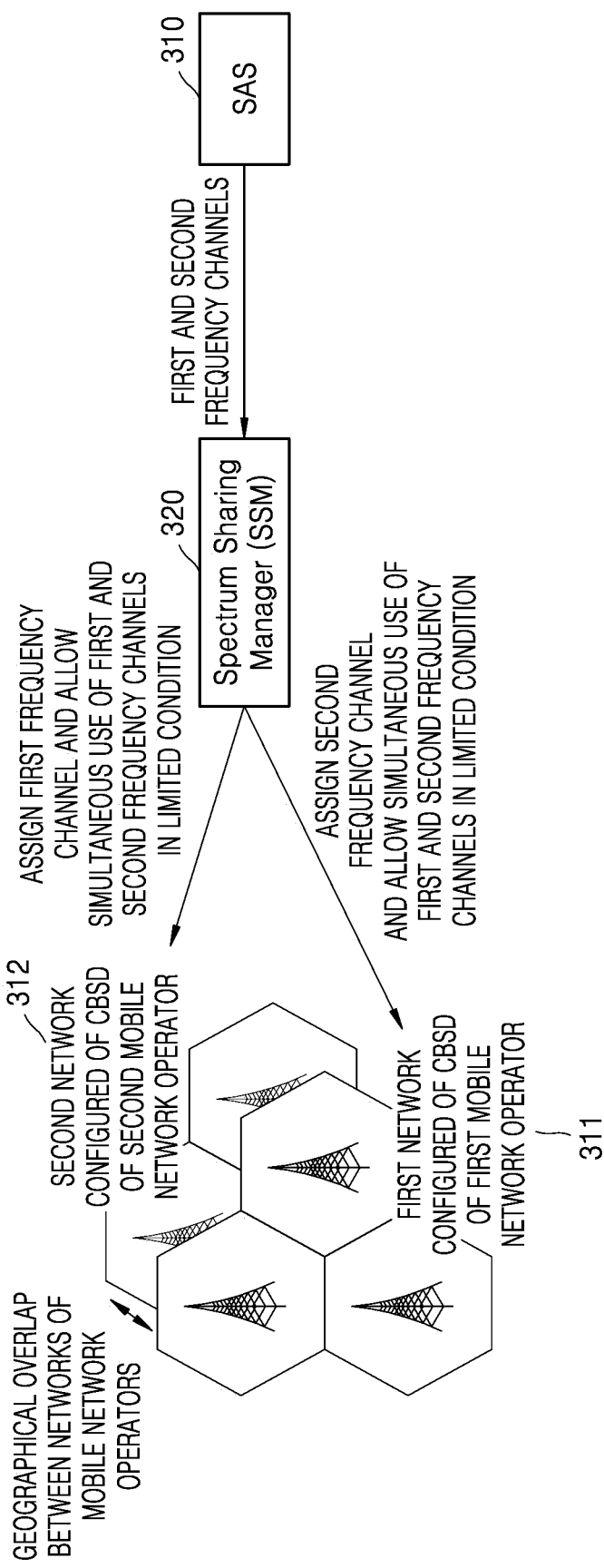
FIG. 3B illustrates a diagram for describing a frequency management method of a network entity, according to an embodiment of the disclosure.

FIG. 3A illustrates a diagram for describing a method by which an SAS assigns a frequency channel, and FIG. 3B illustrates a diagram for describing a frequency management method of a network entity, according to an embodiment of the disclosure.

Referring to FIG. 3A, in an existing CBRS system, there may be a plurality of networks, for example, a first network 311 and a second network 312, geographically overlapping each other and managed by different mobile network operators in a region managed by an SAS 310. In the existing CBRS system, the SAS 310 independently assigns a frequency channel to each network, based on location information of CBSDs. On the other hand, referring to FIG. 3B, frequency sharing (spectrum sharing)-based frequency channel assignment proposed in the disclosure is different from an existing frequency channel assignment method in that a network entity managing frequency channel sharing is assigned with a frequency channel set for the first network 311 and the second network 312 from the SAS 310, and controls each network regarding frequency channel assignment and frequency sharing. The network entity managing the frequency channel sharing may be referred to as a spectrum sharing manager (SSM) 320. However, an embodiment of the disclosure is not limited thereto, and when the network entity managing the frequency channel sharing is included in another network entity, the network entity managing the frequency channel sharing may be referred to by a name of the other network entity. Hereinafter, for convenience of description, the network entity managing the frequency channel sharing will be referred to as the SSM 320.

For example, the SSM 320 may assign CBSDs belonging to the first network 311 with a priority right for use of a first frequency channel, and an auxiliary right for use of a second frequency channel. In other words, the CBSDs belonging to the first network 311 may use the first frequency channel as a primary user (PU) and the second frequency channel as a secondary user (SU). The SSM 320 may configure CBSDs belonging to the second network 312 to use the first frequency channel as an SU and the second frequency channel as a PU. Hereinafter, a channel usable by the CBSD as a PU will be referred to as a PU channel and a channel usable by the CBSD as an SU will be referred to as an SU channel.

As examples of the PU and SU channels defined by the SSM 320, when one CBSD is assigned with the PU channel and the SU channel, the CBSD may unlimitedly use the PU channel and receive a right to use the SU channel only when a CBSD using the SU channel as a PU channel does not use the SU channel. Alternatively, the CBSD may receive a right to use the SU channel only when utilization of the SU channel is equal to or less than a certain level. When such a frequency sharing method is used, the CBSDs are able to use more frequency channels than an existing CBRS resource assignment method, and at least performance in the PU channel is guaranteed, and thus the frequency channel may be further efficiently used in the CBRS system.

In FIG. 3B, an example of the frequency sharing-based frequency channel assignment in the CBRS system has been described, but the frequency sharing (spectrum sharing)-based frequency channel assignment proposed in the disclosure is not limited to the CBRS system. For example, the frequency sharing-based frequency channel assignment proposed in the disclosure may be applied to a frequency band other than a CBRS band and a device other than a CBSD. When the frequency sharing-based frequency channel assignment proposed in the disclosure is applied to the frequency band other than the CBRS band, a network entity managing a frequency channel in a frequency band other than the CBRS band may correspond to an SAS managing a frequency channel in the CBRS system. Hereinafter, for convenience of descriptions, the SAS and the network entity managing a frequency channel will be collectively referred to as a frequency channel management entity.

Hereinafter, a method by which a network entity managing frequency channel sharing performing frequency sharing-based frequency channel assignment will be described. An SSM may operate by being assigned with a frequency channel set in units of clusters from a frequency channel management entity (for example, an SAS). The cluster may have a concept of grouping one or more devices. For example, the cluster may include a plurality of devices or may include one device. The cluster may be defined as a set of a plurality of devices satisfying a certain condition. For example, the cluster may be defined as a set of devices present in a certain region. In this case, when a new device appears in the certain region, the new device may be automatically included in the cluster. Alternatively, a set of a specific plurality of devices may be defined as a device cluster separately from whether the certain condition is satisfied. The cluster including one or more devices may be referred to as a device cluster, a device group, a device set, or the like, and will be referred to as a device cluster hereinbelow. When the device is a CBSD, the device cluster may be referred to as a CBSD cluster.

The network entity managing the frequency channel sharing may request the frequency channel management entity to generate or update the device cluster, and generate or update the device cluster by receiving a response thereto from the frequency channel management entity. During this process, the device cluster may be configured via configuration information for the device cluster. The configuration information for the device cluster may include ID information of the device cluster, a condition (for example, a region, a device ID set, or the like) defining the device cluster, a frequency channel set assigned to the device cluster, maximum transmit power operable for each frequency channel, and information about a device included in the device cluster. Details about the generating or updating of the device cluster will be described with reference to FIGS. 7A through 8B.

Upon being assigned with the device cluster and the frequency channel set usable by the device cluster from the frequency channel management entity, the SSM may manage how to assign frequency channels to devices from the frequency channel set. For example, the frequency channel management entity may provide one device with a right to use a specific channel as a PU and another channel as an SU, like a PU and an SU described in FIG. 3. Accordingly, the plurality of devices included in the device cluster may share at least one frequency channel included in the frequency channel set assigned to the device cluster, and thus the frequency channels may be efficiently used.

Figure 4:
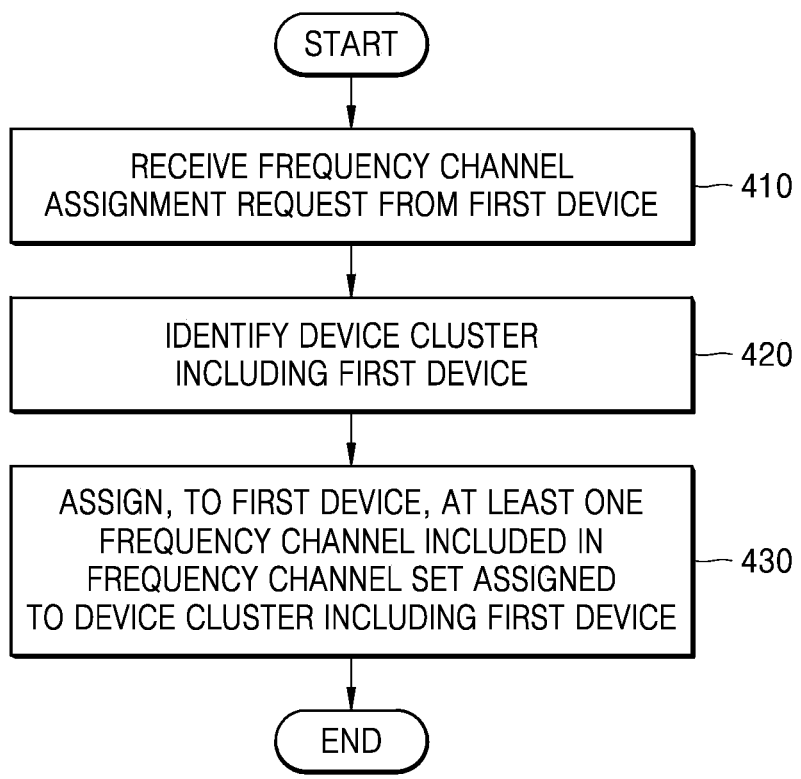
FIG. 4 illustrates a flowchart of a process by which a network entity assigns a frequency channel to a device, according to an embodiment of the disclosure.

FIG. 4 illustrates a flowchart of a process by which a network entity assigns a frequency channel to a device, according to an embodiment of the disclosure.

Referring to FIG. 4, in operation 410, an SSM (i.e., the network entity managing frequency channel sharing) may receive a frequency channel assignment request from a first device. The frequency channel assignment request of the first device may be performed in a same manner as requesting, by a device, channel assignment from a frequency channel management entity. When a frequency channel is assigned by a CBRS system, the device may be a CBSD device and the frequency channel management entity may be an SAS.

In operation 420, the SSM may identify a device cluster including the first device that transmitted the frequency channel assignment request. There may be device clusters being operated by the network entity before the frequency channel assignment request of the first device. Accordingly, the network entity may first identify whether the first device is includable in the existing device cluster being operated. Depending on whether the first device is includable in the existing device cluster being operated, the network entity may update the existing device cluster to include the first device or generate a new device cluster including the first device. The updated existing device cluster or generated new device cluster may be identified as the device cluster including the first device. A method of identifying the device cluster including the first device in operation 420 will be described in detail with reference to FIG. 5.

In operation 430, the SSM may assign, to the first device, at least one frequency channel included in the frequency channel set assigned to the device cluster including the first device. The SSM may identify the frequency channel set assigned to the device cluster including the first device, that is identified in operation 420. The network entity may assign, to the first device, at least one of frequency channels included in the identified frequency channel set. For example, the SSM may assign, to the first device, at least one of the frequency channels included in the identified frequency channel set. Alternatively, the SSM may assign, to the first device, a plurality of frequency channels included in the identified frequency channel set.

For example, the SSM may assign, to the first device, a first frequency channel included in the identified frequency channel set. The SSM may assign, to the first device, the first frequency channel to be used as a PU (i.e., assign as a PU channel). Also, the SSM may assign, to the first device, a second frequency channel to be used as an SU (i.e., assign as an SU channel). The first frequency channel may be a frequency channel assigned to a second device included in the device cluster including the first device to be used as an SU, and the second frequency channel may be a frequency channel assigned to the second device to be used as a PU.

As described above, the SSM may receive the frequency channel assignment request from the device, identify the device cluster including the device, and assign the frequency channel included in the frequency channel set assigned to the device cluster such that the device shares the frequency channel with other devices included in the device cluster. Accordingly, frequency resources may be efficiently used.

Figure 5:
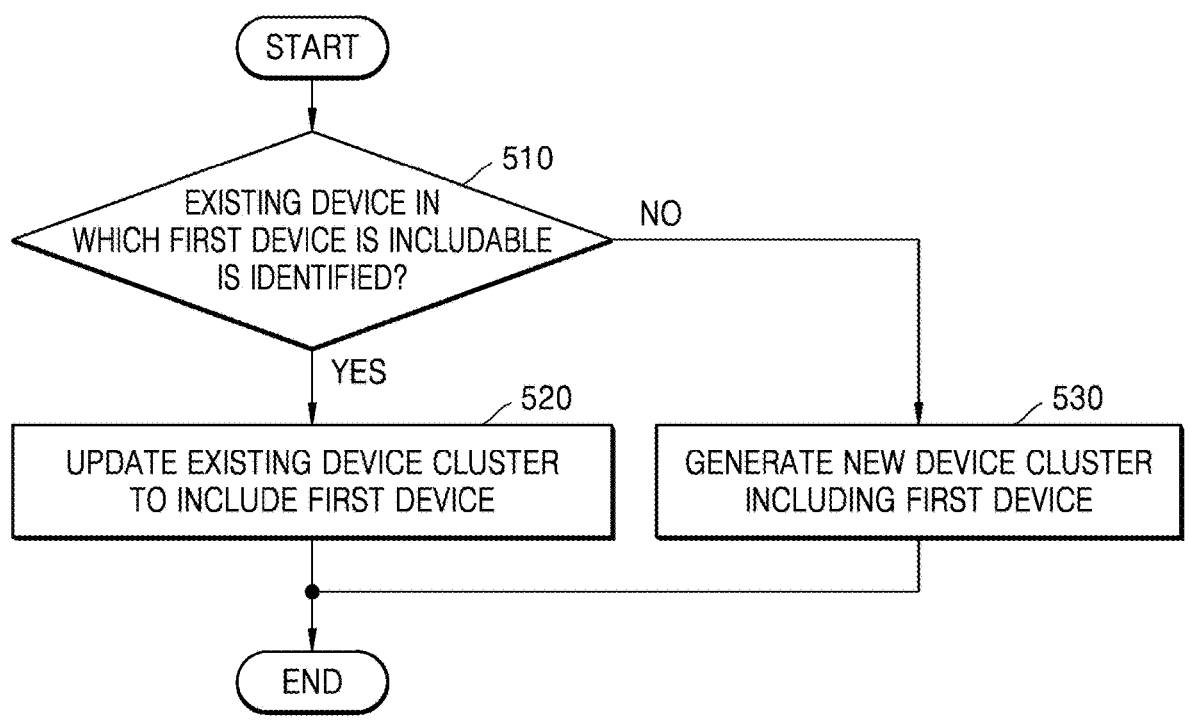
FIG. 5 illustrates a flowchart of a procedure by which a network entity identifies a device cluster including a device that requested frequency channel assignment, according to an embodiment of the disclosure.

FIG. 5 illustrates a flowchart of a procedure by which a network entity identifies a device cluster including a device that requested frequency channel assignment, according to an embodiment of the disclosure. Operations of FIG. 5 are related to detailed procedures of operation 420 of FIG. 4.

In operation 510, an SSM (i.e., the network entity managing frequency channel sharing) may identify an existing device cluster (first device cluster) in which a first device is includable, from among at least one existing device cluster being operated by the SSM. When the SSM is operating a plurality of existing device clusters before receiving a frequency channel assignment request from the first device, the SSM may determine whether the first device satisfies a generation condition corresponding to each of the plurality of existing device clusters. The SSM may identify a device cluster generated based on a certain condition (for example, a certain region) satisfied by the first device, from among the plurality of existing device clusters.

For example, when the first device cluster included in the plurality of existing device clusters is a set of a plurality of devices satisfying the certain condition, the SSM may determine whether the first device satisfies the certain condition. When the first device cluster is defined as a set of devices present in a certain region, the SSM may determine whether the first device is located in a region defining the first device cluster. When the first device satisfies the certain condition corresponding to the first device cluster, the SSM may identify the first device cluster as the device cluster in which the first device is includable. When a plurality of device clusters like the first device cluster in which the first device is includable are identified, the SSM may determine one of the device clusters as the device cluster to include the first device.

The existing device cluster in which the first device is includable may include not only a device cluster generated based on the certain condition satisfied by the first device, but also a device cluster capable of including the first device by updating the certain condition that is a basis of generation. For example, when the device cluster is defined in a certain region and the first device is located near the certain region, the device cluster may be a device cluster in which the first device is includable when the certain region is widened.

When the first device cluster in which the first device is includable is identified in operation 510, the SSM may update the first device cluster to include the first device, in operation 520. Updating of a device cluster may be updating configuration of the device cluster to include a new device. For example, the network entity may update a frequency channel set assigned to the first device cluster to assign a frequency channel to the first device. Also, the SSM may update a certain condition (for example, a region, a device ID set, or the like) defining the first device cluster such as to include the first device.

The SSM may determine whether a frequency channel (for example, a PU/SU channel) is assignable to the first device within the frequency channel set assigned to the first device cluster. When possible, the SSM may assign the first device with PU/SU frequency channels by using the frequency channel set assigned to the first device cluster. When not possible, the SSM may request the frequency channel management entity to update the frequency channel set assigned to the first device cluster. When it is not possible to assign a frequency channel to the first device even by updating the frequency channel set assigned to the first device cluster, the SSM may generate a new device cluster including the first device in operation 530, without updating the first device cluster.

The SSM may transmit an update request for the first device cluster to the frequency channel management entity and update the first device cluster by receiving a response to the update request from the frequency channel management entity. The update request for the first device cluster may include update information for the first device cluster related to the first device, and the update information may include updated configuration information of the first device cluster (for example, update information of a frequency channel set, update information of a certain condition, or the like).

When the first device cluster in which the first device is includable is not identified in operation 510, the SSM may generate a new device cluster (second device cluster) including the first device, in operation 530. The SSM may transmit a generation request for the second device cluster to the frequency channel management entity, and generate the second device cluster by receiving a response to the generation request from the frequency channel management entity. The generation request for the second device cluster includes generation information of the second device cluster related to the first device, and the generation information may include configuration information of the second device cluster to be newly generated (for example, information about a frequency channel set to be assigned, information about a certain condition defining the second device cluster, or the like).

The SSM may identify the first device cluster updated in operation 520 or the second device cluster generated in operation 530 as the device cluster including the first device, and assign the first device with at least one frequency channel included in the frequency channel set assigned to the identified device cluster.

Figure 6A:
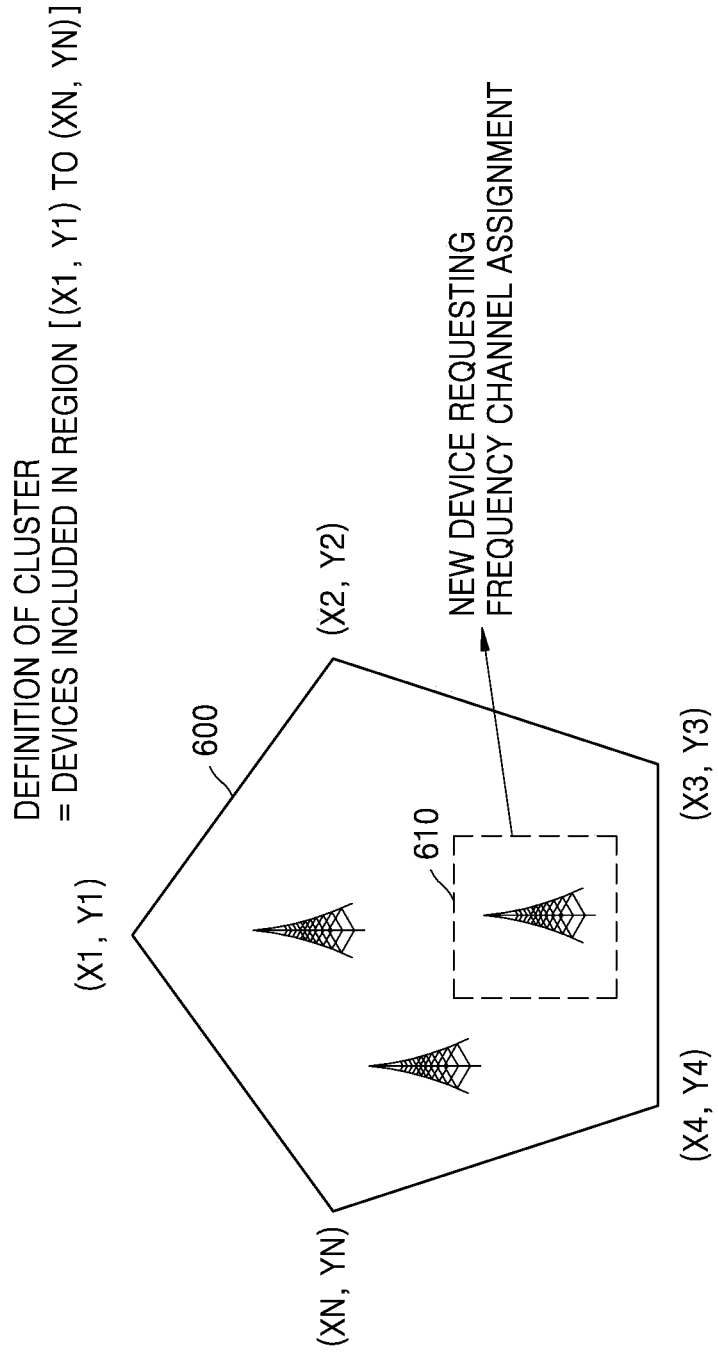
FIG. 6A illustrates a diagram showing an example of a device cluster, according to an embodiment of the disclosure.
Figure 6B:
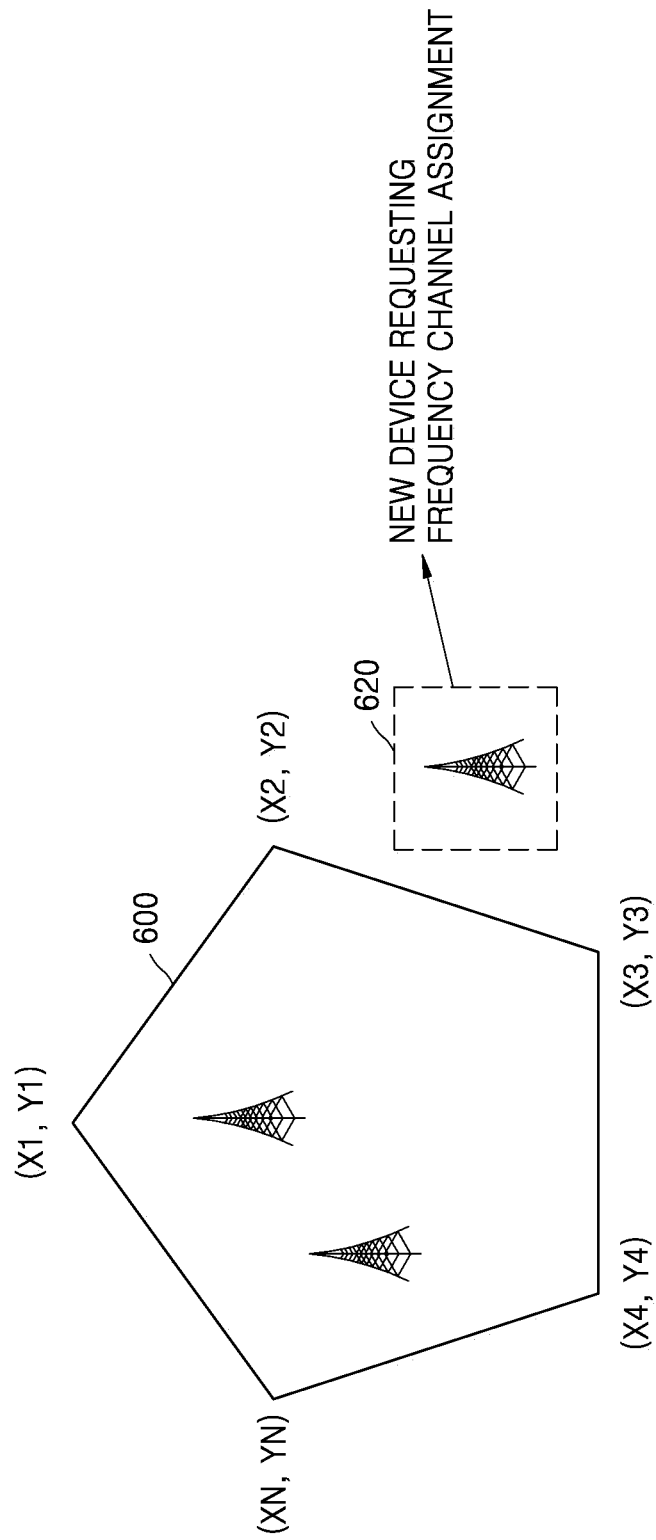
FIG. 6B illustrates a diagram showing an example of a device cluster, according to another embodiment of the disclosure.

FIGS. 6A and 6B illustrate examples of a device cluster, according to embodiments of the disclosure. Referring to FIGS. 6A and 6B, the device cluster may be defined as devices included in a region generated by connecting a plurality of points.

As shown in FIG. 6A, when a new device 610 in a region 600 of a device cluster requests frequency channel assignment, a method of accommodating the new device 610 without changing the region 600 of the current device cluster, a method of generating a new device cluster for the new device 610 by reducing the region 600 of the current device cluster, and the like may be considered.

As shown in FIG. 6B, when a new device 620 is located outside the region 600 of the currently defined device cluster, information of the device cluster may be updated to include the new device 620 by expanding the region 600 of the device cluster to the nearby.

When it is determined to include a device in an existing device cluster in both examples of FIGS. 6A and 6B, PU/SU frequency channels need to be assigned to the device in a frequency channel set assigned to the device cluster, but when an additional frequency channel is required, an SSM may update the frequency channel set assigned to the device cluster by requesting a frequency channel management entity.

Figure 7A:
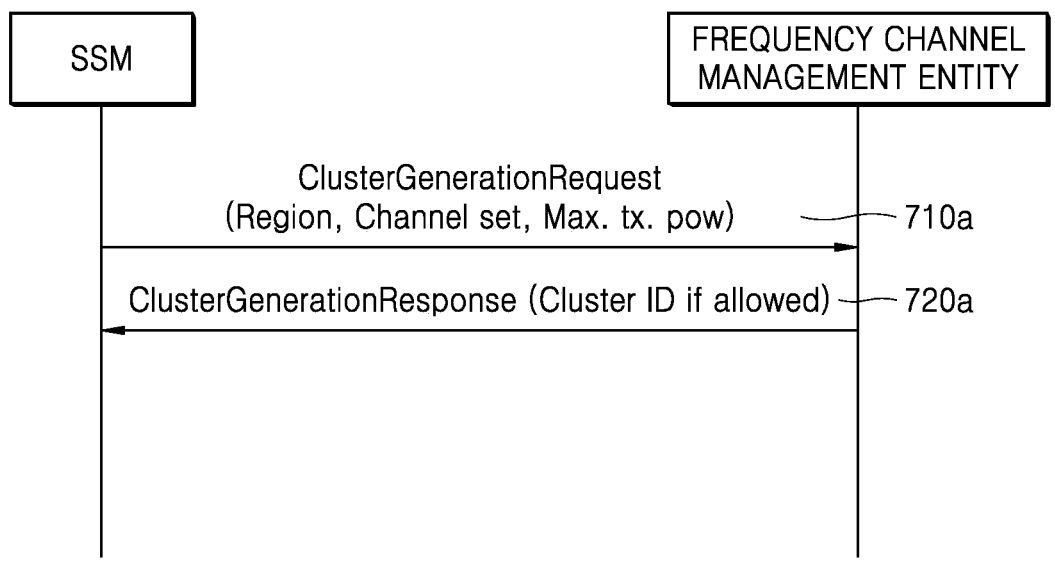
FIG. 7A illustrates a flow diagram showing an example of exchanging a device cluster generation message between a frequency channel management entity and a network entity, according to an embodiment of the disclosure.
Figure 7B:
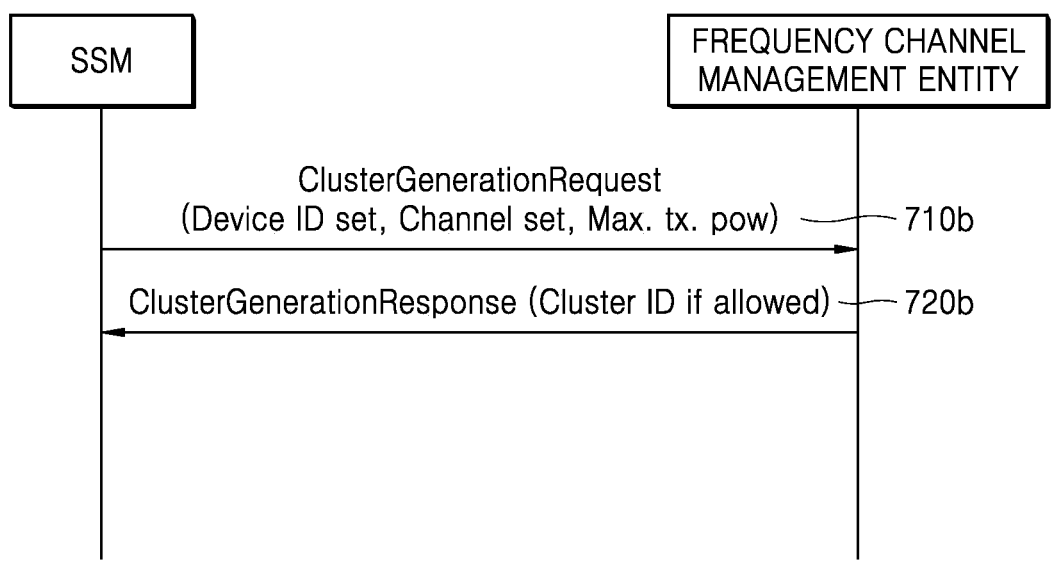
FIG. 7B illustrates a flow diagram showing an example of exchanging a device cluster generation message between a frequency channel management entity and a network entity, according to another embodiment of the disclosure.

FIGS. 7A and 7B illustrate flow diagrams showing examples of exchanging a device cluster generation message between a frequency channel management entity and an SSM, according to embodiments of the disclosure. The embodiments of FIGS. 7A and 7B are related to examples in which the SSM described in FIGS. 4 and 5 requests the frequency channel management entity to generate a device cluster.

In FIG. 7A, a device cluster is defined according to regions. In operation 710a, the SSM may transmit, to the frequency channel management entity, configuration information of a device cluster to be generated, via a ClusterGenerationRequest message. The configuration information of the device cluster to be generated may include information about a region of the device cluster, a frequency channel set that is information about a desired frequency channel, and information about maximum transmit power available in the frequency channel.

In FIG. 7B, a device cluster is defined as a set of specific device IDs. In operation 710b, the SSM may transmit, to the frequency channel management entity, configuration information of a device cluster to be generated, via a ClusterGenerationRequest message. The SSM may denote device IDs to be included in the device cluster to be generated, via the configuration information of the device cluster to be generated. Other pieces of message information are the same as those of FIG. 7A.

When the frequency channel management entity accepts the request, the frequency channel management entity may transmit, to the SSM, a ClusterGenerationResponse message including identification information (cluster ID information) of the device cluster requested to be generated, in operations 720a and 720b.

When the frequency channel management entity denies the request to generate the device cluster via the ClusterGenerationRequest message, the frequency channel management entity may transmit, to the SSM, the ClusterGenerationResponse message including information for modifying a definition of the device cluster or a condition (for example, a region or a device ID set) for defining the device cluster, information for modifying the frequency channel set, information for modifying the maximum transmit power, and the like. The SSM may re-generate the ClusterGenerationRequest message by reflecting the pieces of information received from the frequency channel management entity, and request the frequency channel management entity to generate the device cluster again.

Figure 8A:
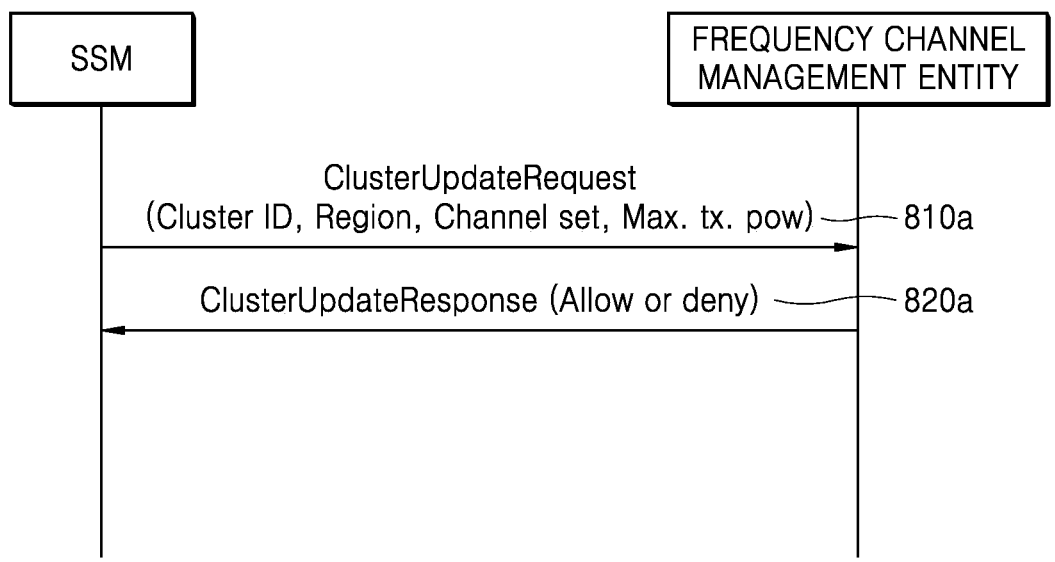
FIG. 8A illustrates a flow diagram showing an example of exchanging a device cluster update message between a frequency channel management entity and a network entity, according to an embodiment of the disclosure.
Figure 8B:
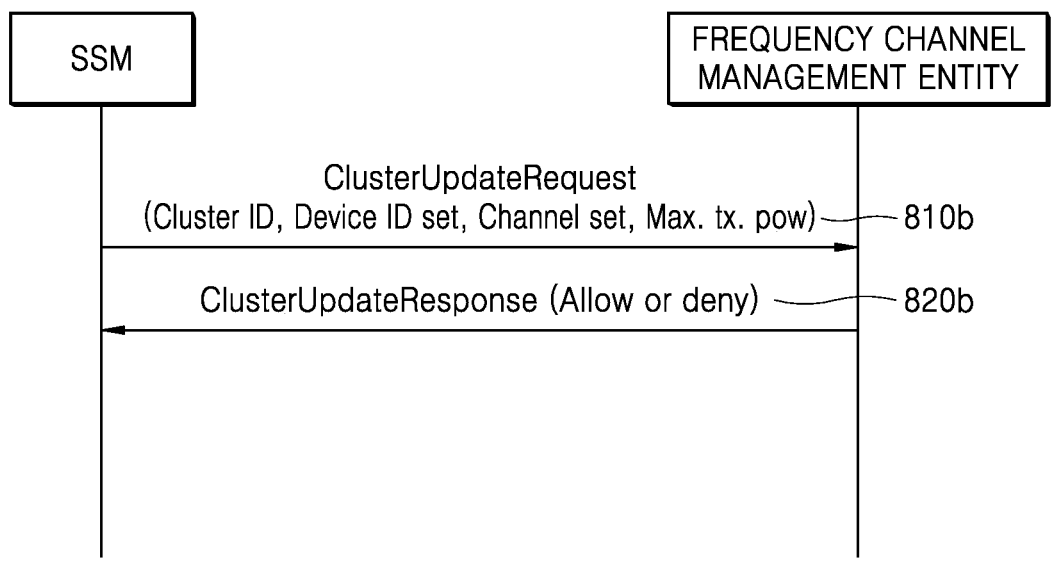
FIG. 8B illustrates a flow diagram showing an example of exchanging a device cluster update message between a frequency channel management entity and a network entity, according to another embodiment of the disclosure.

FIGS. 8A and 8B illustrate flow diagrams showing example of exchanging a device cluster update message between a frequency channel management entity and an SSM, according to embodiments of the disclosure. The embodiments of FIGS. 8A and 8B are related to examples in which the SSM described in FIGS. 4 and 5 requests the frequency channel management entity to update a device cluster.

In FIG. 8A, a device cluster is defined according to regions. In operation 810a, the SSM may transmit, to the frequency channel management entity, configuration information of a device cluster to be updated, via a ClusterUpdateRequest message. The configuration information of the device cluster to be updated may include update information about a region of the device cluster, a frequency channel set that is information about a desired frequency channel, and information about maximum transmit power available in the frequency channel.

In FIG. 8B, a device cluster is defined as a set of specific device IDs. In operation 810b, the SSM may transmit, to the frequency channel management entity, configuration information of a device cluster to be updated, via the ClusterUpdateRequest message. The SSM may denote device IDs to be included in the device cluster to be updated, via the configuration information of the device cluster to be updated. Other pieces of message information are the same as those of FIG. 8A.

When the frequency channel management entity accepts the request, the frequency channel management entity may transmit, to the SSM, a ClusterUpdateResponse message including allowance or denial of updating of the device cluster requested to be updated, in operations 820a and 820b.

Unlike the generating of the device cluster of FIGS. 7A and 7B, the updating of the device cluster is for updating configuration (or content) of the device cluster that has been generated, the ClusterUpdateRequest message includes cluster ID information of the device cluster that has been generated. Also, unlike the generating of the device cluster, content without a change in the configuration information of the device cluster included in the ClusterUpdateRequest message may be omitted.

Figure 9A:
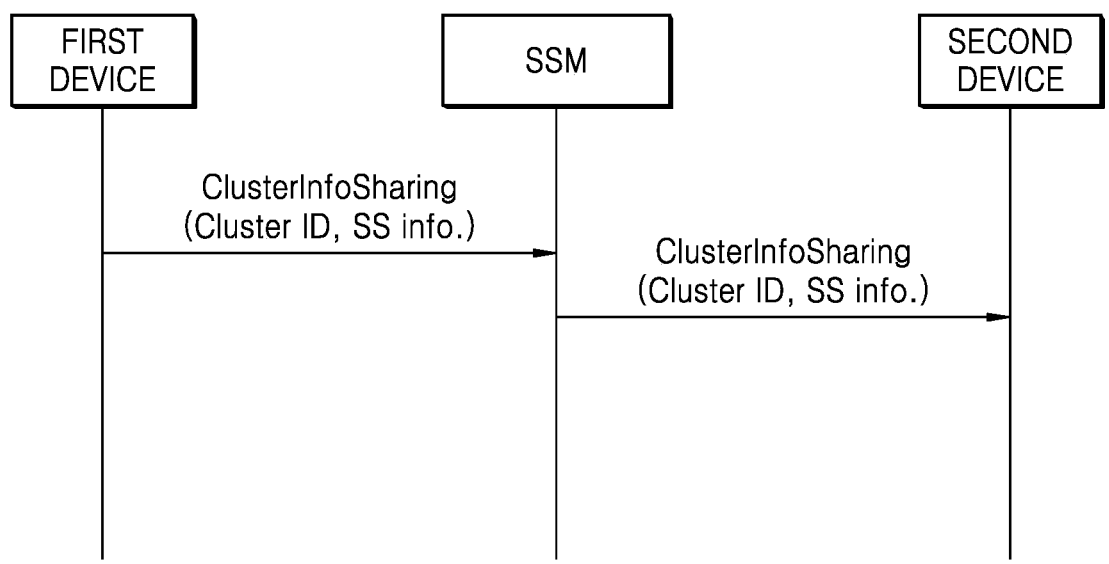
FIG. 9A illustrates a flow diagram showing an example of transmitting, by a network entity, a message between devices in a device cluster, according to an embodiment of the disclosure.

FIG. 9A illustrates a flow diagram showing an example of transmitting, by an SSM, a message between devices in a device cluster, according to an embodiment of the disclosure. The devices in the device cluster may commonly use a same frequency channel via PU/SU frequency channel assignment described above. For example, a device (SU device) using a specific frequency channel as an SU may determine that a device (PU device) using the specific frequency channel as a PU is not using the specific frequency channel, and use the specific frequency channel.

Accordingly, the devices in the device cluster need to share frequency sharing (spectrum sharing)-related information. The frequency sharing-related information may be transmitted from one device to another device by being included in a ClusterInfoSharing message, and the ClusterInfoSharing message may include a device cluster ID, frequency sharing information (spectrum sharing (SS) information), and the like.

As shown in FIG. 9A, the SSM may receive, from a specific device (first device), the ClusterInfoSharing message including the frequency sharing-related information, and transmit the received message to a device (second device) belonging to a same device cluster. The first device and the second device may share a specific frequency channel (first frequency channel). Alternatively, the SSM may receive the ClusterInfoSharing message, process information about frequency channel usage based on information included in the ClusterInfoSharing message, and transmit the processed information to other devices.

In this regard, the SS information may include any information that helps other devices to smoothly share a frequency, such as a traffic condition, a resource usage pattern, or the like of a device transmitting the ClusterInfoSharing message.

Figure 9B:
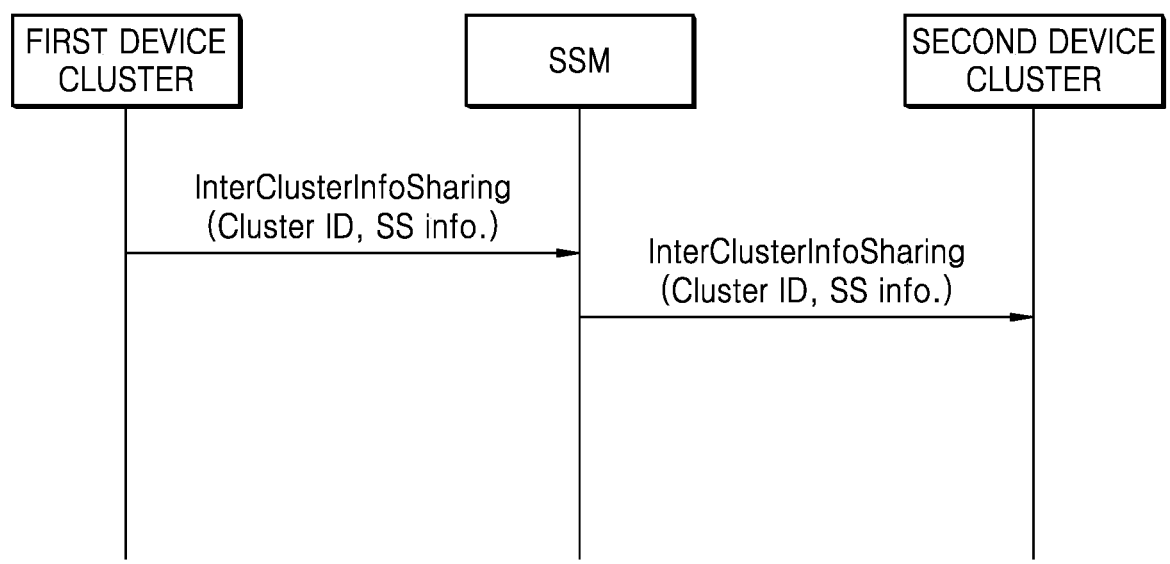
FIG. 9B illustrates a flow diagram showing an example of transmitting, by a network entity, a message between device clusters, according to an embodiment of the disclosure.

FIG. 9B illustrates a flow diagram showing an example of transmitting, by an SSM, a message between device clusters, according to an embodiment of the disclosure. Referring to FIG. 9B, the SSM may help different device clusters to exchange information. For example, for an SU device of a first device cluster to use a PU channel, a situation of an adjacent second device cluster may need to be considered. In this regard, maximum transmit power and the like for the SU device of the first device cluster to use the PU channel may be shared with the second device cluster.

Figure 10:
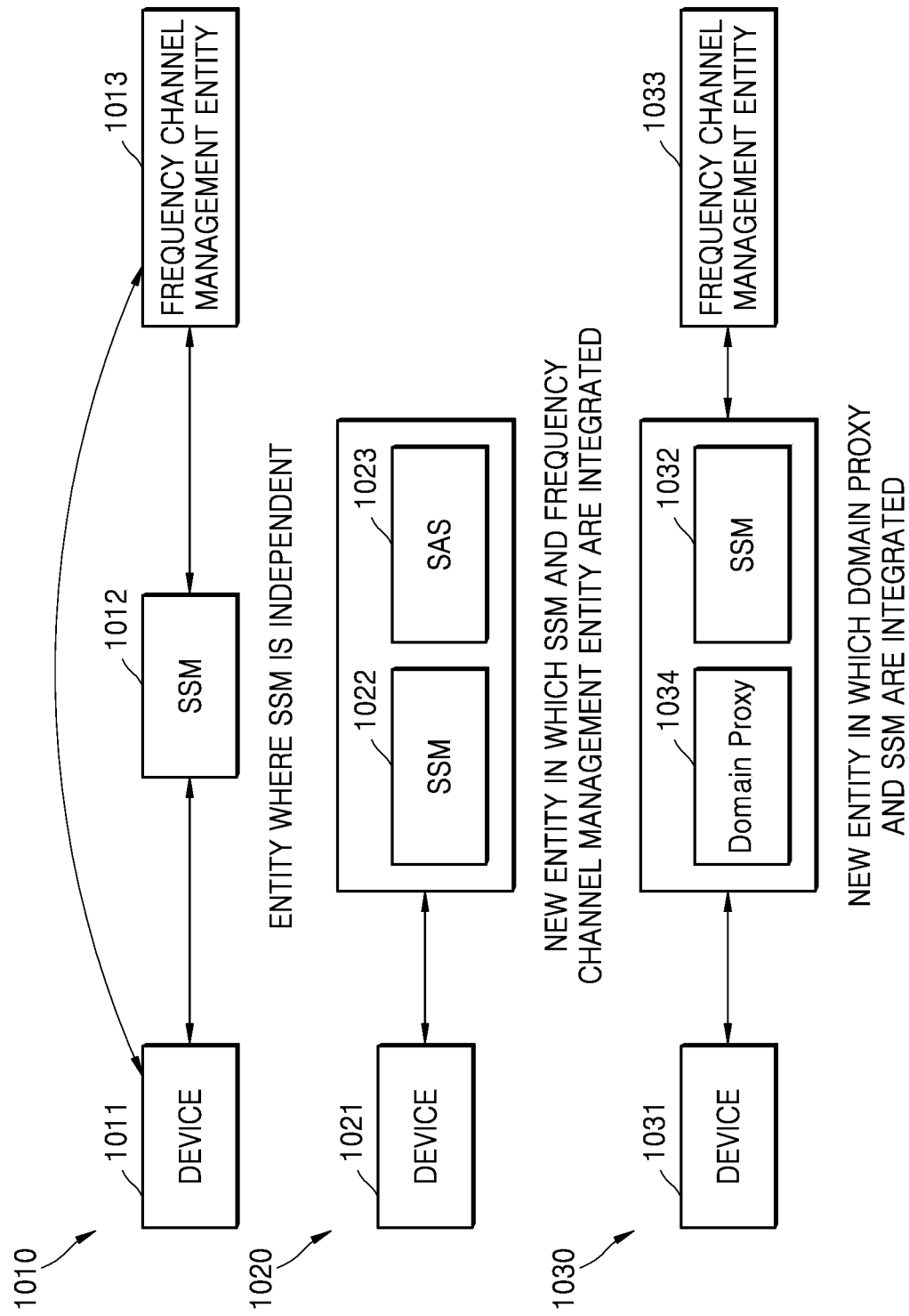
FIG. 10 illustrates a diagram showing examples of architectures of network entities, according to embodiments of the disclosure.

FIG. 10 illustrates a diagram showing examples of architectures 1010, 1020, and 1030 of SSMs 1012, 1022, and 1032, according to embodiments of the disclosure. An SSM may be present in any one of various architectures in a CBRS system.

As shown in the architecture 1010, the SSM 1012 may be present as an independent network entity. In the architecture 1010, a device 1011 may communicate with the SSM 1012 after direct communication with a frequency channel management entity 1013 during initial registration. Alternatively, the device 1011 may initially register in the frequency channel management entity 1013 via the SSM 1012.

As in the architecture 1020, the SSM 1022 may be present in a form of being integrated with a frequency channel management entity 1023. Functions of the SSM 1022 according to an embodiment of the disclosure may be defined as functions in one network entity in which the frequency channel management entity 1023 and the SSM 1022 are integrated. The frequency channel management entity 1023 to which the SSM 1022 is integrated may assign a frequency channel to a device 1021, according to an embodiment of the disclosure.

As in the architecture 1030, the SSM 1032 may be present by being integrated with a domain proxy 1034 communicating with a frequency channel management entity 1033, by grouping a plurality of devices 1031.

Figure 11:
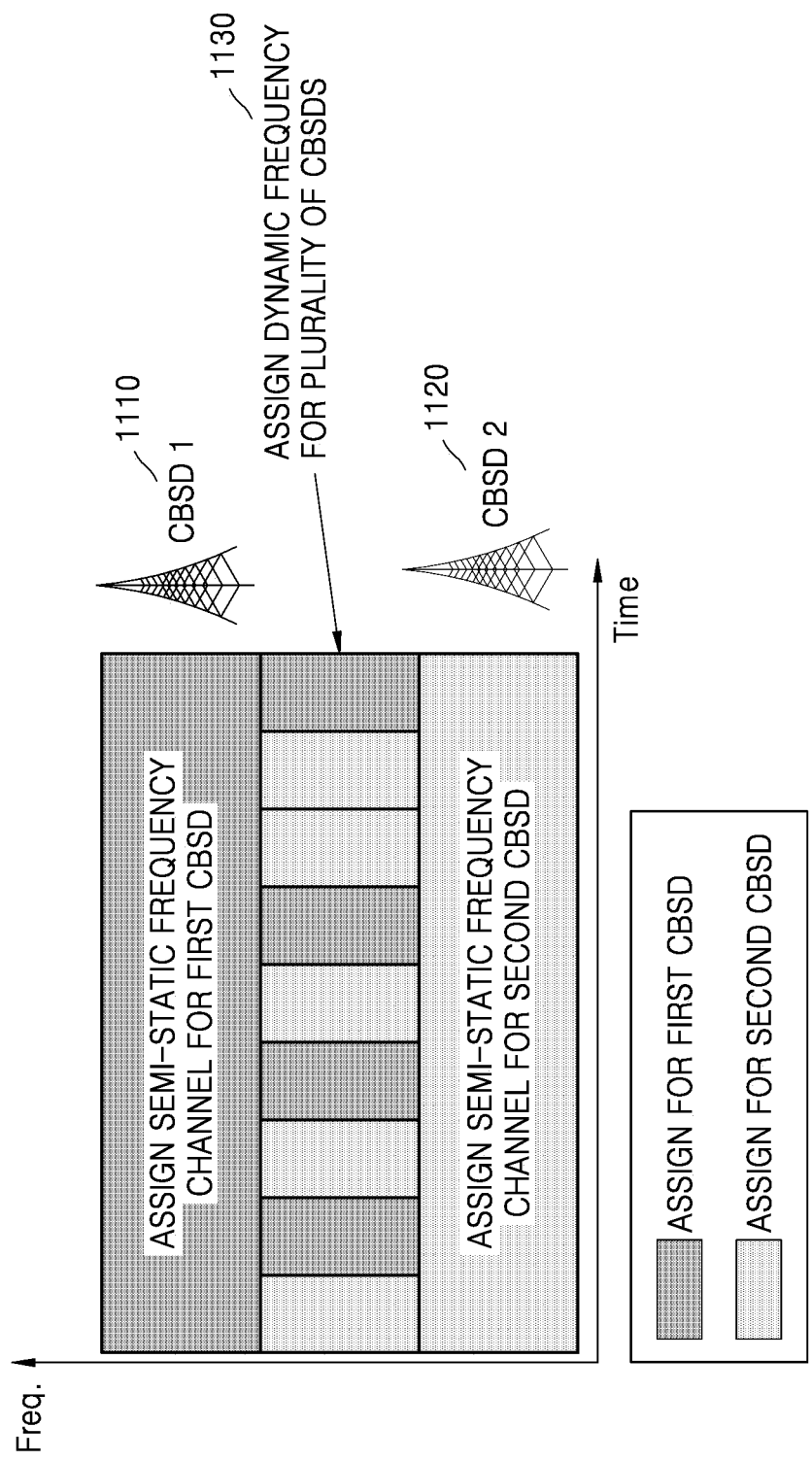
FIG. 11 illustrates a diagram showing an example of dynamically assigning a frequency from a same frequency channel to a plurality of devices, according to an embodiment of the disclosure.

FIG. 11 illustrates a diagram showing an example of dynamically assigning a frequency from a same frequency channel to a plurality of devices, according to an embodiment of the disclosure. As described with reference to FIGS. 1 and 2, a current CBRS system uses frequency resources by assigning a frequency channel to a CBSD via a grant procedure and then continuously extending a usage time of the frequency channel via a heartbeat procedure. When it is required to empty the frequency channel, the CBSD needs to start the grant procedure to receive a new resource. Due to delay and overhead occurring during these procedures, a current CBRS system may not be suitable for dynamic frequency channel operation, such as assigning a frequency channel that was assigned to a specific CBSD again to another CBSD.

Referring to FIG. 11, a specific frequency channel 1130 may be dynamically assigned to a first CBSD 1110 and a second CBSD 1120, according to time. As shown in FIG. 11, when it is possible to dynamically assign the specific frequency channel 1130 to the plurality of CBSDs, i.e., the first and second CBSDs 1110 and 1120, frequency channel assignment may be variably performed depending on a traffic amount to be processed by the first and second CBSDs 1110 and 1120.

Figure 12:
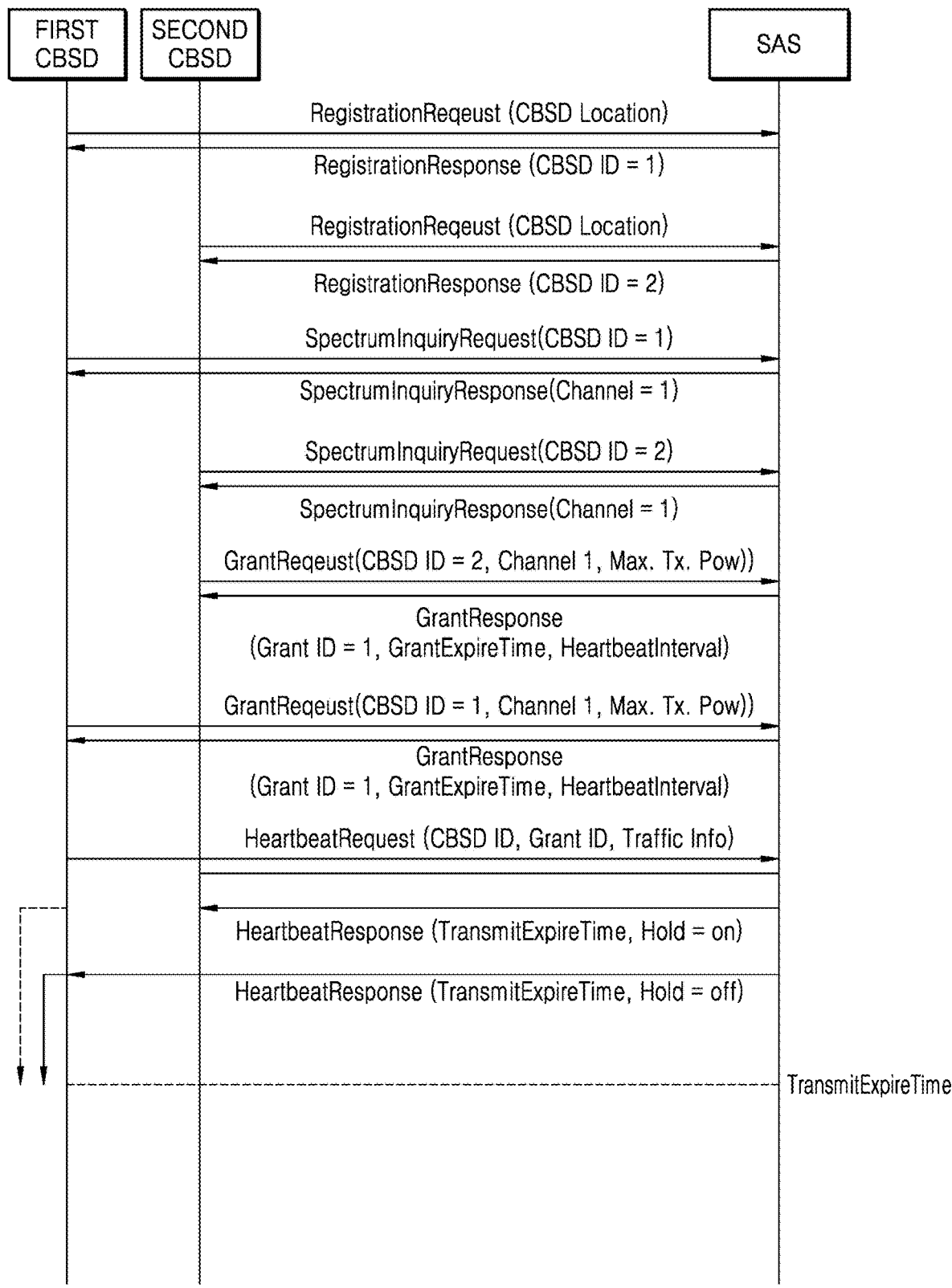
FIG. 12 illustrates a flow diagram showing an example of a message exchange procedure between an SAS and a device for dynamic frequency assignment, according to an embodiment of the disclosure.

FIG. 12 illustrates a flow diagram showing an example of a message exchange procedure between an SAS and a CBSD for dynamic frequency assignment, according to an embodiment of the disclosure. The SAS may determine locations of a first CBSD and a second CBSD via a registration procedure, and determine to assign a same frequency channel to both the first and second CBSDs. For example, the SAS may specify both the first CBSD and the second CBSD to request grant for the same frequency channel, via a spectrum inquiry procedure between the SAS and the first and second CBSDs. Accordingly, the first CBSD and the second CBSD may successfully perform a grant procedure for the same frequency channel, and receive an update of the TransmitExpireTime that is a time for using a corresponding resource via a heartbeat procedure.

As an example of one of methods proposed in the disclosure, the SAS may adjust actual transmissivity of the first and second CBSDs via a hold parameter (용어일치 위해 수정). The SAS may specify the TransmitExpireTime while allowing transmission for the first CBSD (hold=off) and notifying the second CBSD to temporarily stop transmission (hold=on) via the parameter. To help the SAS to determine transmissivity of the first and second CBSDs, the first and second CBSDs may add current traffic situation information or the like to a HeartbeatRequest message. By using such a hold parameter, the SAS may adjust the transmissivity of each of the first and second CBSDs at intervals of a heartbeat procedure cycle.

Also, the SAS may further dynamically assign the transmission of each of the first and second CBSDs by using more types of information than the hold parameter. For example, the SAS may add time scheduling information to a HeartbeatResponse message. For example, when T denotes a scheduling cycle and P denotes a heartbeat cycle, [P/T] scheduling units are present in one heartbeat cycle. Accordingly, the SAS may notify each CBSD whether a corresponding resource is available in each scheduling unit by using [P/T] bits, such as 110011 or 001100 (an example where 6 scheduling units are present). By using such a method, the SAS may dynamically assign a frequency to the first and second CBSDs in time units shorter than the heartbeat cycle.

Figure 13:
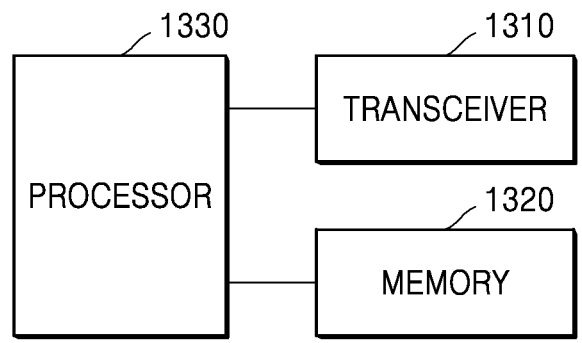
FIG. 13 illustrates a block diagram of a configuration of a device, according to an embodiment of the disclosure.

FIG. 13 illustrates a block diagram of a configuration of a device, according to an embodiment of the disclosure.

As shown in FIG. 13, the device according to an embodiment of the disclosure may include a processor 1330, a transceiver 1310, and a memory 1320. However, the components of the device are not limited thereto. For example, the device may include more or fewer components than those described above. In addition, the processor 1330, the transceiver 1310, and the memory 1320 may be implemented as a single chip. According to an embodiment of the disclosure, the device may include a CBSD.

According to an embodiment of the disclosure, the processor 1330 may control a series of processes for the device to operate according to an embodiment of the disclosure. For example, the processor 1330 may control the components of the device to perform a dynamic frequency sharing method according to an embodiment of the disclosure. There may be a plurality of processors 1330 and the processor 1330 may execute a program stored in the memory 1320 to perform transmission/reception operations of the device in a wireless communication system to which the dynamic frequency sharing method described above is applied.

The transceiver 1310 may transmit or receive a signal to or from another network entity (for example, an SSM, a frequency channel management entity, or an SAS). The transmitted or received signal may include control information and data. The transceiver 1310 may include a RF transmitter for up-converting and amplifying a frequency of a transmitted signal, and a RF receiver for amplifying low-noise and down-converting a frequency of a received signal. However, this is only an embodiment of the disclosure of the transceiver 1310 and components of the transceiver 1310 are not limited to the RF transmitter and the RF receiver. Also, the transceiver 1310 may receive and output, to the processor 1330, a signal through a wireless channel, and transmit a signal output from the processor 1330 through the wireless channel.

According to an embodiment of the disclosure, the memory 1320 may store a program and data required for operations of the device. Also, the memory 1320 may store the control information or data included in the signal transmitted and received by the device. The memory 1320 may include a storage medium, such as read-only memory (ROM), random access memory (RAM), a hard disk, a CD-ROM, or a DVD, or a combination of storage media. There may be a plurality of memories 1320. According to an embodiment of the disclosure, the memory 1320 may store a program for performing the transmission/reception operations of the device in the wireless communication system to which the dynamic frequency sharing method according to an embodiment of the disclosure is applied.

Figure 14:
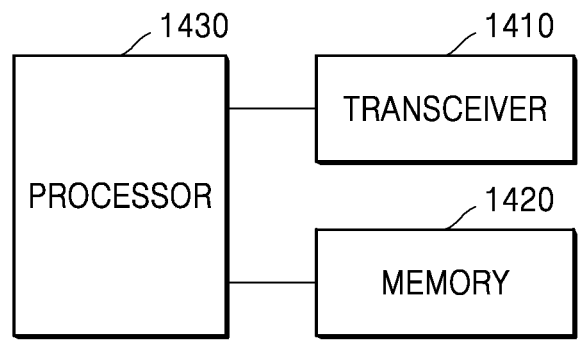
FIG. 14 illustrates a block diagram of a configuration of a network entity, according to an embodiment of the disclosure.

FIG. 14 illustrates a block diagram of a configuration of a network entity, according to an embodiment of the disclosure; and As shown in FIG. 14, the network entity according to an embodiment of the disclosure may include a processor 1430, a transceiver 1410, and a memory 1420. However, the components of the network entity are not limited thereto. For example, the network entity may include more or fewer components than those described above. In addition, the processor 1430, the transceiver 1410, and the memory 1420 may be implemented as a single chip. According to an embodiment of the disclosure, the network entity may be a network entity for managing frequency channel sharing. For example, the network entity may be an SSM.

The processor 1430 may control a series of processes such that the network entity operates as described above. For example, the processor 1430 may control the components of the network entity to perform a dynamic frequency sharing method according to an embodiment of the disclosure. There may be a plurality of processors 1430 and the processor 1430 may execute a program stored in the memory 1420 to perform the dynamic frequency sharing method described above.

The transceiver 1410 may transmit or receive a signal to or from another network entity (for example, a device, a CBSD, a frequency channel management entity, or an SAS). The signal transmitted or received by the transceiver 1410 may include control information and data. The transceiver 1410 may include a RF transmitter for up-converting and amplifying a frequency of a transmitted signal, and a RF receiver for amplifying low-noise and down-converting a frequency of a received signal. However, this is only an embodiment of the disclosure of the transceiver 1410 and components of the transceiver 1410 are not limited to the RF transmitter and the RF receiver. Also, the transceiver 1410 may receive and output, to the processor 1430, a signal through a wireless channel, and transmit a signal output from the processor 1430 through the wireless channel.

According to an embodiment of the disclosure, the memory 1420 may store a program and data required for operations of the network entity. Also, the memory 1420 may store the control information or data included in the signal transmitted and received by the network entity. The memory 1420 may be a storage medium, such as ROM, RAM, a hard disk, a CD-ROM, or a DVD, or a combination of storage media. Also, there may be a plurality of the memories 1420. According to an embodiment of the disclosure, the memory 1420 may store a program for performing the dynamic frequency sharing method according to an embodiment of the disclosure.

The methods according to the embodiments of the disclosure described in the claims or the detailed description of the disclosure may be implemented in hardware, software, or a combination of hardware and software.

Figure 15:
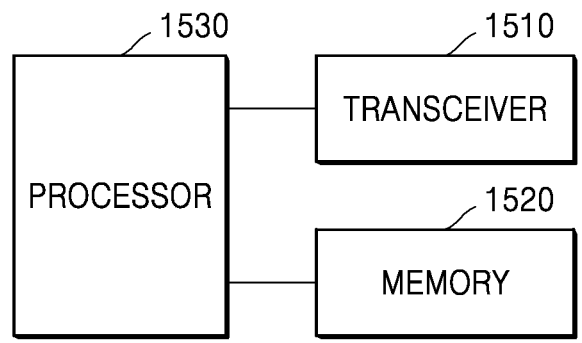
FIG. 15 illustrates a block diagram of a configuration of a frequency channel management entity, according to an embodiment of the disclosure.

FIG. 15 illustrates a block diagram of a configuration of a frequency channel management entity, according to an embodiment of the disclosure.

As shown in FIG. 15, the frequency channel management entity according to an embodiment of the disclosure may include a processor 1530, a transceiver 1510, and a memory 1520. However, the components of the frequency channel management entity are not limited thereto. For example, the frequency channel management entity may include more or fewer components than those described above. In addition, the processor 1530, the transceiver 1510, and the memory 1520 may be implemented as a single chip. According to an embodiment of the disclosure, the frequency channel management entity may include an SAS.

The processor 1530 may control a series of processes such that the frequency channel management entity operates as described above. For example, the processor 1530 may control the components of the frequency channel management entity to perform a dynamic frequency sharing method according to an embodiment of the disclosure. There may be a plurality of processors 1530 and the processor 1530 may execute a program stored in the memory 1520 to perform the dynamic frequency sharing method described above.

The transceiver 1510 may transmit or receive a signal to or from another network entity (for example, a CBSD or an SSM). The signal transmitted or received by the transceiver 1510 may include control information and data. The transceiver 1510 may include a RF transmitter for up-converting and amplifying a frequency of a transmitted signal, and a RF receiver for amplifying low-noise and down-converting a frequency of a received signal. However, this is only an embodiment of the disclosure of the transceiver 1510 and components of the transceiver 1510 are not limited to the RF transmitter and the RF receiver. Also, the transceiver 1510 may receive and output, to the processor 1530, a signal through a wireless channel, and transmit a signal output from the processor 1530 through the wireless channel.

According to an embodiment of the disclosure, the memory 1520 may store a program and data required for operations of the frequency channel management entity. Also, the memory 1520 may store the control information or data included in the signal transmitted and received by the frequency channel management entity. The memory 1520 may be a storage medium, such as ROM, RAM, a hard disk, a CD-ROM, or a DVD, or a combination of storage media. Also, there may be a plurality of the memories 1520. According to an embodiment of the disclosure, the memory 1520 may store a program for performing the dynamic frequency sharing method according to an embodiment of the disclosure.

The methods according to the embodiments of the disclosure described in the claims or the detailed description of the disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device that is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the disclosure, the term 'computer program product' or 'computer-readable medium' is used to entirely refer to a medium such as a memory, a hard disk installed in a hard disk drive, or a signal. The 'computer program product' or 'computer-readable medium' is used to provide a transmitting or receiving method of a UE in a wireless communication system to which a carrier bundle according to an embodiment of the disclosure is applied.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

In addition, the present specification and drawings disclose exemplary embodiments of the disclosure, and although specific terms are used, these are merely used in a general sense to easily explain the technical contents of the disclosure and to help understanding of the disclosure, and not intended to limit the scope of the disclosure. For example, the disclosure is based on a combined scenario of different systems, such as an LTE system and a 5G system, but may be generalized and applied to a carrier bundle operation in a same system (for example, a 5G system). Also, the disclosure may be applied to a combined scenario with a 5G system and a 6G system that is to be introduced later. It will be apparent to one of ordinary skill in the art that other modifications based on the technical idea of the disclosure may be carried out in addition to the embodiments of the disclosure. Also, the embodiments of the disclosure may be combined with each other as required.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a network entity, of assigning a frequency channel, the method comprising:
   receiving a frequency channel assignment request from a first device;
   identifying a first device cluster in which the first device is includable from among at least one device cluster being operated by the network entity, wherein the first device cluster is generated based on a condition satisfied by the first device;
   in case that the first device cluster is identified, updating the first device cluster to include the first device; and
   assigning, to the first device, at least one frequency channel included in a frequency channel set assigned to the first device cluster including the first device,
   wherein the first device cluster satisfies the condition and is a set of a plurality of devices, the plurality of devices to be sharing at least one frequency channel included in the frequency channel set,
   wherein, in case that the first device cluster is not identified, generating a second device cluster including the first device,
   wherein the first device is operated by a first network operator and a second device included in the first device cluster is operated by a second network operator, and
   wherein the assigning of the at least one frequency channel to the first device comprises:
      from among the at least one frequency channel included in the frequency channel set:
         assigning a first frequency channel to the first device to be used as a primary user, and
         assigning a second frequency channel to the first device to be used as a secondary user when utilization of the second frequency channel is less than a threshold utilization level.

2. The method of claim 1, wherein the set of the plurality of devices is a set of a plurality of devices present in an area or a set of a plurality of a citizen broadband radio service (CBRS) devices (CBSDs) corresponding to a set of specific device identifications (IDs).

3. The method of claim 1, wherein the first device cluster in which the first device is includable comprises a device cluster generated based on the condition that is also satisfied by the first device.

4. The method of claim 1, wherein the updating of the first device cluster comprises:
   transmitting, to a frequency channel management entity, an update request for the first device cluster; and
   receiving, from the frequency channel management entity, a response to the update request,
   wherein the update request comprises update information about the first device cluster related to the first device.

5. The method of claim 1, wherein the generating of the second device cluster comprises:
   transmitting, to a frequency channel management entity, a generation request of the second device cluster; and
   receiving, from the frequency channel management entity, a response to the generation request of the second device cluster,
   wherein the generation request comprises generation information about the second device cluster related to the first device.

6. The method of claim 1, wherein:
   the first frequency channel is a frequency channel assigned to the second device included in the device cluster to be used as a secondary user, and
   the second frequency channel is a frequency channel assigned to the second device to be used as a primary user.

7. The method of claim 1, further comprising:
   receiving, from the first device, frequency sharing-related information for the at least one frequency channel; and
   transmitting, to the second device included in the device cluster, the frequency sharing-related information for the at least one frequency channel.

8. A network entity for assigning a frequency channel, the network entity comprising:
   a transceiver; and
   a processor coupled to the transceiver and configured to:
      receive a frequency channel assignment request from a first device;
      identify a first device cluster in which the first device is includable from among at least one device cluster being operated by the network entity, wherein the first device cluster is generated based on a condition satisfied by the first device;
in case that the first device cluster is identified, update the first device cluster to include the first device; and
assign, to the first device, at least one frequency channel included in a frequency channel set assigned to the first device cluster including the first device,
wherein the first device cluster satisfies the condition and is a set of a plurality of devices, the plurality of devices to be sharing at least one frequency channel included in the frequency channel set,
wherein, in case that the first device cluster is not identified, generating a second device cluster including the first device,
wherein the first device is operated by a first network operator and a second device included in the first device cluster is operated by a second network operator, and
wherein the processor is further configured to:
from among the at least one frequency channel included in the frequency channel set:
assign a first frequency channel to the first device to be used as a primary user, and
assign a second frequency channel to the first device to be used as a secondary user when utilization of the second frequency channel is less than a threshold utilization level.

9. The network entity of claim 8, wherein the set of the plurality of devices comprises a set of a plurality of devices present in an area or a set of a plurality of a citizen broadband radio service (CBRS) devices (CBSDs) corresponding to a set of specific device identifications (IDs).

10. The network entity of claim 8, wherein the first device cluster in which the first device is includable comprises a device cluster generated based on the condition that is also satisfied by the first device.

11. The network entity of claim 8, wherein the processor is further configured to:
transmit, to a frequency channel management entity, an update request for the first device cluster; and
receive, from the frequency channel management entity, a response to the update request,
wherein the update request comprises update information about the first device cluster related to the first device.

12. The network entity of claim 8, wherein the processor is further configured to:
transmit, to a frequency channel management entity, a generation request of the second device cluster; and
receive, from the frequency channel management entity, a response to the generation request of the second device cluster,
wherein the generation request comprises generation information about the second device cluster related to the first device.

13. The network entity of claim 8, wherein:
the first frequency channel is a frequency channel assigned to the second device included in the device cluster to be used as a secondary user, and
the second frequency channel is a frequency channel assigned to the second device to be used as a primary user.

14. The network entity of claim 8, wherein the processor is further configured to:
receive, from the first device, frequency sharing-related information for the at least one frequency channel; and
transmit, to a second device included in the device cluster, the frequency sharing-related information for the at least one frequency channel.

* * * * *